Patented Sept. 27, 1949

2,482,756

UNITED STATES PATENT OFFICE 2,482,756

FLAMEPROOFING OF FIBROUS MATERIALS

Florence M. Ford and William P. Hall, Wilmington, Del., assignors to Joseph Bancroft & Sons Co., Wilmington, Del., a corporation of Delaware No Drawing. Application June 10, 1944, Serial No. 539,798

4 Claims. (Cl. 8—116.3)

This invention relates to the flameproofing of cellulosic and protein materials and is particularly useful in the flameproofing of textile fabrics especially those used for wearing apparel wherein a non-toxic, durable, relatively odorless finish is desired without unduly altering the "hand" and feel of the original fabric.

It has long been known that the treatment of, for example, cellulose with phosphoric acid solutions in the cold results in formation of unstable addition compounds which are immediately decomposed when treated with water. If the cellulose is heated after treatment with a phosphoric acid solution, reactions take place resulting ultimately in the highly degraded form of cellulose called hydrocellulose. It is therefore impossible, to the best of our knowledge, to obtain durable flameproof cellulosic materials by the direct reaction between phosphoric acid solutions and cellulose.

In our previous application Serial No. 514,822, filed December 18, 1943, now abandoned, of which the instant application is a continuation in part, we have described a process involving the use of ortho-phosphoric acid (and similar acids) and urea (or materials similar to urea), by which process a durable flameproof finish is imparted with greatly reduced degradation and tendering of the cellulose and protein materials.

The present application is directed to an improvement of the process of said application by virtue of which degradation and tendering of the fibrous material is still more reduced. Moreover, by this present process greater strength may be obtained and swelling and stiffening of the fibers on subjection to water is greatly reduced. From the above aspects, the present invention represents an outstanding improvement on results heretofore obtained in this type of finish.

Briefly, we propose to add to the mixture containing the acid, the nitrogen compound and their reaction products a volatile or decomposable alkaline agent (such as ammonium hydroxide) which will temporarily increase the pH of the mixture in order to stabilize the solution when the additional ingredients are added as described below. After the solution has been applied to the material this volatile alkaline agent is removed or altered during the curing operation, thus bringing about a pH condition which is favorable to the formation of water insoluble compounds between the ingredients of the solution and between these ingredients and the material.

The additional compound, or compounds, we propose to add to the solution prior to application is an agent (such as formaldehyde) which, inter alia, has strong affinity for the nitrogen containing compounds and tends to combine with them under the condition of the process to form complexes which would not be formed in its absence and which perform functions to be hereinafter pointed out.

Some of these complexes, which contain most of the acid groups, create a condition of steric hindrance when the acid groups react on the material during the curing operation and thus increases the buffering action already exerted by the nitrogen containing compound by virtue of the basic nitrogen it contains.

In general the last mentioned additional agent added, having affinity for the nitrogen compound, also has affinity under the conditions of the process for the reactive groups of the material to be flameproofed and this acts as an additional buffer by competing with the acid for these reactive groups.

After the solution, containing the ingredients described above, has been applied, the material is dried and cured which, as stated, drives off the volatile or decomposable alkaline agent and produces water insoluble compounds between the ingredients of the solution, and between these insoluble compounds and the material to be flameproofed, and between the ingredients of the solution and the material, thus imparting to the material durable flameproof properties with a minimum loss in strength qualities.

In carrying out the invention the ortho-phosphoric acid (or similar acids) and the urea (or similar nitrogen containing compound), are mixed and heated to a high temperature, say from about 260° F. to about 400° F., 365° F. being satisfactory in most instances. The heating to the desired temperature is preferably done rapidly. As soon as the desired temperature is reached, heat is cut off and the mixture allowed to cool. During the heating, complex reactions take place between the phosphoric acid and the urea, and between the acid and the products formed by the alteration of the urea at high temperatures; carbon dioxide, ammonia, and also water, are liberated, and the heated mixture, if allowed to cool sufficiently, sets to a solid rock-like mass, soluble in water.

To the products of heating, preferably shortly before solidifying, water is added approximately in amount equal to the loss of total weight experienced in the heating. Ammonia or like alkaline material and formaldehyde or like material are then added separately in the order mentioned, or simultaneously as a mixture, or as a compound, such as hexamethylene tetramine. This produces what may be termed a standard solution which may then be further diluted to any desired concentration.

The ammonia is the volatile alkaline agent which tends to increase the pH of the solution (or dispersion). The amount of such agent added should be sufficient to adjust the pH to such a value that objectionable formation of insoluble compounds is avoided, especially when the aldehyde is added, thus rendering the solution substantially stable. The pH necessary to this end will vary somewhat with the particular ingredients of the reactive solution or dispersion. The preferred pH is on the order of from about 6 to about 8. The solution in this state is substantially stable. The alkaline agent should be one which is removed in the subsequent heating operations taking place after the solution has been applied to the fibers for the reason that during such heating there should be a return to acidic conditions. Ammonium hydroxide, being decomposable and volatile, is well suited for the purpose. The ammonia also makes it possible to use a smaller quantity of urea than would otherwise be required. The urea, as will appear, in part acts as a buffer, reducing the action of the phosphoric acid. The use of too much urea for this purpose is, however, undesirable as it lengthens the time required for curing. The ammonia, therefore, performs several important functions, even though of temporary character.

In case the nitrogen containing compound and the acid, either preheated or unheated, produces a solution of satisfactory pH giving satisfactory stability when the aldehyde is added, the addition of alkaline base such as ammonia may be dispensed with.

The formaldehyde used, as will appear and as already stated, has the effect of introducing more nitrogen into the compound or compounds produced on curing, with consequent increase of buffering action due partly to the increase in steric hindrance caused by the large complexes formed. Under the acid conditions which come about through the removal of the ammonia during the subsequent heating of the material, the aldehyde reacts with the cellulose to some extent, thus bringing about a further buffering action.

The standard solution made from the phosphoric acid, urea, ammonia and formaldehyde, and diluted with water to the desired extent, is now applied, for example, to a fabric in any conventional way as by padding, immersion, coating, spraying, printing and other forms of coating or impregnation, either with or without pressure.

With respect to the dilution of the standard solution, this is not critical. It is to be noted that the chemicals should be gotten on and into the material in amount sufficient to produce the desired flameproof characteristics. It is preferable to have the solution sufficiently concentrated to permit of obtaining sufficient material by one application. Otherwise it may be necessary to run the material through the mangle two or more times with or without intervening dryings. This, however, adds to the expense and is to be avoided whenever possible.

It is also possible to add the ingredients separately to the material. For example, a textile fabric may be impregnated with a mixture of urea and phosphoric acid, which may or may not have been heated as described, and then dried. This impregnation to be followed by one of formaldehyde and ammonium hydroxide or only formaldehyde and then dried. After curing and washing a durable flameproof material is obtained. This method of procedure, however, is not as desirable.

After the fabric has been treated with the solution, it is dried and then cured. The fabric may be dried by passing it through a drying atmosphere, say of about 300° F. Where such temperature is employed, the cloth remains in the dryer about 30 seconds but only comes to 300° F. for a few seconds. The drying temperature may be somewhat lower or higher, with a corresponding change in the length of time in the drier, the essential object being to remove the excess water from the cloth.

The dried fabric is now cured in a curing oven or the like at temperatures desirably ranging from about 270° F. to about 345° F. for a period of time ranging from 23 minutes to about 2 minutes. At 250° F. the time required for curing may run as high as 2 hours which is undesirably long. At a temperature of 400° F. the time for curing may be only 30 seconds. The temperature and the time should be such as will effect the curing without objectionable injury to the fabric. The preferred temperature range is from 290° F. to 345° F. The preferred time will vary somewhat with the particular composition and the particular fabric to be treated. Usually from 40 minutes to 2 minutes will suffice for most conditions.

The fabric after curing is given a wash in hot water, squeezed and then dried. Any materials present in the fabric and not substantially insolubilized are removed in this final washing, leaving on the fabric only such chemicals as would contribute toward the durable flameproofing properties of the finish.

It is obvious that the individual steps in the process, namely, application of the solution, drying, curing, washing, and drying may be carried out as individual steps, or combined into fewer steps, or if desired run as a continuous process.

It is evident that reactions take place between the ingredients of the treating mixture even in the cold. When heated together to high temperatures the nitrogen containing compound and the acid react and form a number of complex compounds which in the case of urea and phosphoric acid are soluble in water (provided the materials are not heated to too high a temperature and too long; for example, at 430° F., an insoluble product is formed).

When ammonia and formaldehyde are added, further reaction takes place, but the materials formed are still soluble in water in the case of urea and phosphoric acid.

Subsequent curing, in the main, primarily brings about further reactions (in addition to those already taken place during preparation of the solution) between the ingredients of the solution and between the ingredients and the cellulose.

These reactions are primarily as follows: first, a combination between the phosphoric acid group and the cellulose; second, a further reaction takes place between the urea and the phosphoric acid group; third, reactions take place between the urea, some of which may already be in combination with phosphoric acid, and the formaldehyde, resulting in the formation in many cases of large complex molecules; fourth, a reaction takes place between formaldehyde and the cellulose.

All these reactions take place simultaneously during the curing, one reaction competing with the other. For example, in the case of the cellulose, the urea, and the phosphoric acid, a competition takes place between the cellulose and the urea for the phosphoric acid. In other words, the urea acts as a buffer for the reaction between the cellulose and the phosphoric acid. The buffering action of the urea is enhanced by the large size of the nitrogen containing compounds caused by the combination between the formaldehyde and urea. This increase in buffering action is due, first, to the neutralizing action caused by the presence of a large number of basic nitrogen groups close to the phosphoric acid, and, second, to the steric hindrance effect caused by the large size of the aldehyde-nitrogen-phosphorus complex. This steric hindrance prevents the easy access of the phosphoric acid to the cellulose.

In addition, a further buffering action takes place as already stated by the action of the formaldehyde upon the reactive groups of the cellulose. This concurrent reaction competes with the phosphoric acid for the reactive groups of the cellulose and therefore acts as a buffer.

In the case of protein fibers such as wool, the same reactions take place, but in this case the groups in the protein fibers are much more reactive than the groups of the cellulose. Thus, for example, at a certain concentration of formaldehyde excellent results may be obtained on cellulose but the results on wool are less satisfactory due to the excess action between the aldehyde and the wool. This is the reason why our previous patent application where aldehydes were not used is better adapted to protein fibers. On protein fibers it is therefore best to use smaller percentages of aldehyde. To illustrate, if in Example 1 hereof, 5 parts of formaldehyde instead of 10 parts are used, satisfactory results are obtained.

Whether or not the foregoing theories are correct, the fact remains that analysis of the finished product shows that when the aldehyde is used, the ratio of nitrogen to phosphorus is much larger, which would tend to establish that additional nitrogen groups are held in combination by means of the aldehyde. Some of these nitrogen groups are not held as firmly as the phosphorus groups. Repeated severe hot water washes reduce the nitrogen content until a ratio of phosphorus-nitrogen is reached which corresponds closely to that obtained when the aldehyde is not used. Thus, while the increased nitrogen content may not be regarded as permanently lasting, nevertheless there is a binding which serves the distinct purpose of maintaining high nitrogen content and thus increased buffering action during the curing. And the product obtained has considerably increased strength.

The presence of the aldehyde groups in the finished product tends to reduce the swelling in water since the aldehyde has combined primarily with the groups having a high affinity for water, and thus decreases the ability of these groups to absorb water. Fabrics flameproofed without aldehyde swell and subsequently stiffen, relatively very considerably on subjection to water, whereas when the aldehyde is present the swelling and subsequent stiffening is only slight.

We have found that although the urea, phosphoric acid, water, ammonium hydroxide, and formaldehyde may be mixed cold and applied to the material, it is very beneficial to heat together the acid and the urea as previously described. For example, if the same quantity of ingredients are used, we find that the preheated mix first, produces a solution of higher pH; second, imparts a higher pH to the finished, flameproofed material; third, reduces the swelling in water of the finished product; fourth, shortens the time of curing for the same temperature; and, fifth, lessens the stiffness of the finished product. The latter is especially important when the process is applied to materials such as garment fabrics.

The following four examples illustrate variations obtainable with the same chemical ingredients in different proportions and using different methods of application. These examples illustrate but do not limit the invention.

*Example 1*

100 parts of urea and 50 parts ortho-phosphoric acid (75%) were mixed and heated rapidly to 375° F. The resulting mixture was cooled, 75 parts of water was added, followed by the addition of 7 parts of ammonium hydroxide (28%), and 10 parts of formaldehyde (37%). In this and the following examples, all parts given are by weight.

The resulting solution was water clear and a cotton fabric (herringbone twill) was impregnated with the same by passing it through a regular textile impregnating mangle, the operation consisting in dipping the cloth into the solution followed by a squeeze to remove excess solution. Then followed drying on the regular tenter frame, the temperature being approximately 300° F. The cloth was allowed to remain in the frame long enough to remove the water by evaporation.

One section of the cotton fabric was cured at a temperature of 345° F. for a period of 2 minutes and 10 seconds. This was followed by washing in hot water and drying.

Another part of the same cloth was cured at 300° F. for a period of 13 minutes, this again being followed by the wash in hot water and drying.

The two samples were found to be substantially equal in flameproof qualities and the respective finishes were of substantially equal durability.

*Example 2*

A solution prepared in the identical manner described in Example 1 was made and consisted of 100 parts of urea, 50 parts of ortho-phosphoric acid (75%), 7 parts of ammonium hydroxide (28%), 50 parts of formaldehyde (37%) and 50 parts of water.

The solution was water-clear and cotton cloth (herringbone twill) was again impregnated as described in the previous example and the cloth dried on the tenter frame as described.

One part of the cloth was cured at 345° F. for a period of 3 minutes and 40 seconds, followed by the usual wash in hot water and drying.

Another part of the cloth was cured at 300° F. for a period of 22 minutes, this again being followed by washing in hot water and drying.

The two samples were substantially equally flameproofed and the durability of the finish was likewise substantially the same.

The essential difference between the solutions of Examples 1 and 2 is that in Example 2, 50 parts of formaldehyde were used instead of 10 parts as in Example 1. The increase in the quantity of formaldehyde increases the time required for curing.

It is also to be noted that with increase in the temperature of curing, the time needed for curing is reduced, and vice versa.

Example 3

A solution was prepared as before, but consisted of 100 parts of urea, 50 parts of orthophosphoric acid (75%), 7 parts ammonium hydroxide (28%), 27 parts of formaldehyde (37%) and 55 parts water.

The water-clear solution was applied to cotton fabric and the fabric dried in a tenter as described in the other examples.

The fabric was then cured at 250° F. for a period of 2 hours, followed by the usual washing and drying procedure. The resulting fabric was found to be flameproof and the flameproofing qualities and the durability of the finish were quite satisfactory.

This example again shows that with decrease in the curing temperature a longer period for the cure is required.

Example 4

The formula and method of procedure in this example was identical with that described in the previous example, but in this case the cotton cloth was cured at a temperature of 400° F. for a period of 30 seconds, followed by the usual washing and drying procedure.

The finish was both satisfactory and durable.

In all of the examples above given, the original "hand" and feel of the fabric was substantially retained, there was no objectionable stiffness, there was little degradation or tendering, and the finished fabric had good tensile strength, tear strength, and little tendency to swell in water. While the fabric will flame on application of a torch, on removal the flame goes out immediately and there is no afterglow. The finish is fast to dry cleaning, hot and cold water leaching, and to repeated laundry treatments with detergents such as Igepon T (a substituted amide of oleic acid—$C_{17}H_{33}CONMeCH_2CH_2SO_3Na$). It will and alkaline detergents without objectionable even withstand several mild washings with soap loss of finish.

The ratio of urea to ortho-phosphoric acid is not critical, although it is to be noted that the urea should not be greater than approximately 10 mols to one mol of phosphoric acid. This seems to be about the practical upper limit. It is also to be observed that with increase in urea content, there is an increase in the time required for curing. The general range of urea content is from 1 to 10 mols to one mol of phosphoric and the preferred range, giving the optimum results, is from 1.75 mols to 5 mols of urea to 1 mol of phosphoric acid.

The amount of ammonium hydroxide is not critical in the sense that more ammonia may be added than is needed to secure the desired pH of the solution, any excess being driven off in the subsequent drying and curing operations. It should not be used in amounts so large as to cause excessive dilution and to cause such a high pH as to interfere with stability of the solution. We have usually found it advantageous to add from ¼ mol to 1 mol of ammonia ($NH_3$) to every mol of ortho-phosphoric acid used.

It will be seen that the percentages of aldehyde added may be varied between wide limits. If the aldehyde is kept very close to the lower limit, care must be exercised in curing as less buffering action takes place as described in the proposed mechanism. If excessively high content of aldehyde is added, too much buffering action takes place and long curing is necessary. In fact if the aldehyde is added in sufficient quantities so much buffering may be obtained that the process becomes impractical and a satisfactory durable flameproof finish is not obtained. The general range for the formaldehyde is on the order of from .2 mol to 1.5 mol to one mol of ortho-phosphoric acid, and the preferred range is from .4 mol to 1.0 mol to one mol of phosphoric acid.

Because of the number of chemical constituents in the solution, and because these constituents may be replaced not only by other and similar constituents falling inside the group, but also by various substitution products of these constituents, it will be seen that the possible variations are great in number. However, the general observations herein made will serve as a guide in any particular case.

In all the previous examples, use has been made of ortho-phosphoric acid ($H_3PO_4$) but other acids of phosphorus, such as, for example, ortho-phosphorus acid, meta-phosphoric acid, and pyrophosphoric may be used. Also substituted phosphoric acids have been tried and found satisfactory, such as, for example, monochlorphosphoric acid and phosphamic acid. Oxides of phosphorus which in the presence of water will form the acids may also be used; for example, good results have been obtained using phosphorus pentoxide.

For example, a solution of 300 parts of urea, 100 parts phosphorus pentoxide, $P_2O_5$, 200 parts water, 100 parts ammonium hydroxide (28%) and 50 parts formaldehyde (37%) gave good results.

In place of the phosphoric acid we may use other strong acids such as, for example, sulphamic acid, in which case we have found, for example, that a solution consisting of 200 parts urea, 100 parts sulphamic acid, 100 parts water, 15 parts ammonium hydroxide (28%) and 50 parts formaldehyde (37%), gives good results.

We have also found that we may use concentrated sulphuric acid as well as phosphoric and sulphamic acid. With a solution consisting, for example, of 180 parts urea, 60 parts sulphuric acid conc., 50 parts water, 15 parts ammonium hydroxide (28%) and 50 parts formaldehyde (37%), we have secured good results.

We have also used mixed acids. For example, a solution consisting of 200 parts urea, 50 parts of ortho-phosphoric acid (75%), 50 parts of conc. sulfuric acid, 100 parts of water, 15 parts ammonium hydroxide (28%) and 50 parts formaldehyde (37%), gave good results.

The acid (or combination of acids) should be strong acids like those specifically mentioned, for they must be active enough to react, under the conditions of the process, with the cellulose and nitrogen containing compound and should contribute in the imparting of the flameproofing properties. They should be substantially non-volatile under the heat conditions of the process. Thus hydrochloric acid is unusable. They should not contain objectionable quantities of ingredients which would tend to increase the flammability, and therefore one cannot use acids containing a high carbon content, such as the fatty acids or other high carbon content acids. They should not react with the cellulose to produce explosive or flammable compounds. Thus nitric acid is unsuitable. A small amount of nitric acid could be used in partial substitution for the phosphoric acid for example.

In general we prefer to use the strong inorganic acids of the above characteristics as they have the necessary activity to combine with the material to be flameproofed and with the other ingredients of the solution; and due to the absence of carbon in these acids they substantially contribute to the flameproofing qualities of the finished product.

The salts of such strong acids with volatile bases such as, for example, ammonium phosphate, and acid salts of the metallic elements may also be used providing the remaining acid properties of the acid are sufficient to perform the desired functions, and provided the metallic elements do not interfere excessively with the solubility of the ingredients of the mixture. Thus any metals precipitating the ingredients upon dilution are undesirable.

We may also use resins instead of formaldehyde. With a solution consisting, for example, of 75 parts urea, 50 parts phosphoric acid (75%), 53 parts water, 7 parts ammonium hydroxide (28%) and 160 parts of Aerotex Cream #450, a urea formaldehyde resin (40%), marketed by Calco Chemical Company, we have obtained good results. Other usable resins are water soluble phenol-formaldehyde resins and ketone-aldehyde resins. For example—

200 parts urea, 100 parts ortho-phophoric acid (75%), 15 parts ammonium hydroxide, 50 parts of water, and 100 parts of a ketone-aldehyde resin. The latter was prepared by refluxing together for 2 hours 250 parts of acetone, 535 parts of formaldehyde (37%), and 6.5 parts of sodium carbonate.

The above flameproofing solution was applied as previously described and good flameproofing results were obtained.

Another example of the use of resins is as follows: 100 parts of urea, 50 parts of ortho-phosphoric acid (75%), 25 parts water, 8 parts ammonium hydroxide, and 60 g. of a phenol-formaldehyde resin. The last material was prepared by heating together 38 parts of phenol, 49 parts formaldehyde (37%), .4 part sodium carbonate, and 1 part ammonium hydroxide (28%). The flameproofing solution above was applied to cotton fabric in the usual manner, and the resulting product was firm but had good durable flameproofing properties.

We may also use aldehydes other than formaldehyde. For example, a solution consisting of 200 parts urea, 100 parts phosphoric acid (75%), 114 parts water, 15 parts ammonium hydroxide (28%) and 50 parts of glyoxal (30%), gives good results.

As further illustrative, we may use a halogenated aldehyde instead of formaldehyde. A solution consisting of 200 parts urea, 100 parts phosphoric acid, (75%), 114 parts water, 15 parts ammonium hydroxide (28%) and 75 parts chloral hydrate, gives good results.

We have also employed a mixture of aldehydes. For example, a solution consisting of 200 parts urea, 100 parts ortho-phosphoric acid (75%), 100 parts water, 15 parts ammonium hydroxide (28%), 25 parts formaldehyde (37%), and 25 parts glyoxal (30%) gave good results.

Other aldehydes may be used such as, for example, acetaldehyde, acrolein and aldol. The aldehyde should be of low molecular weight (a carbon chain of from 1 to 4), reactive with the nitrogen containing compound and desirably also with the cellulose under the conditions of process as previously described. The length of the carbon chain should not be so great as to contribute measurably to the flammability of the finished product and it becomes evident that in general the less the carbon content, the better the results obtained. Since an aldehyde of fairly strong activity is required, the low molecular weight aldehydes with very reactive aldehyde groups and short carbon chain such as those specifically mentioned should preferably be employed. These give the proper balance between nitrogen, phosphorus, and carbon present, so that satisfactory flameproofing properties are obtained.

We may use nitrogen compounds other than urea. Thus, for example, a solution containing 100 parts dicyandiamide, 200 parts phosphoric acid (75%), 100 parts water, 15 parts ammonium hydroxide (28%), and 25 parts formaldehyde (37%), gave good results.

As a further illustration, we may use biuret instead of urea. A solution consisting of 200 parts biuret, 100 parts phosphoric acid (75%), 150 parts water, 25 parts ammonium hydroxide (28%), 25 parts formaldehyde (37%), gives good results.

We may use amino guanidine carbonate (a salt) instead of urea. A solution consisting, for example, of 100 parts aminoguanidine carbonate, 50 parts phosphoric acid (75%), 80 parts water, 25 parts ammonium hydroxide (26%) and 25 parts formaldehyde (37%), gave good results.

We have also used mixed nitrogen-containing compounds. For example, a solution consisting of 100 parts urea, 100 parts aminoguanidine carbonate, 100 parts phosphoric acid (75%), 100 parts water, 15 parts ammonium hydroxide (28%), 50 parts formaldehyde (37%), gave good results.

We have used other salts. Urea sulphate and guanidine sulphate; and urea phosphate and guanidine and amino guanidine phosphates; may be used instead of the urea and give good results.

In general the nitrogen containing compound should contain nitrogen groups capable of reacting with the acid and the aldehyde of the reacting mixture to the desired extent. It should not contain large carbon chains which would contribute excessively to the flammability of the finished product, and should preferably contain a large percentage of nitrogen.

We prefer to use relatively weak nitrogen-containing bases, such as urea, for the reason that the process is easier to control. If relatively much stronger nitrogen bases be used, greater care in proportioning must be employed for the reason that such strong bases have correspondingly greater affinity for the phosphorous groups than has the cellulose. Because of this, care must be exercised lest too much protective action is obtained which would result in loss of permanency, or too little, which would result in excessive tendering.

For example, the following flameproofing solution when applied to cotton fabrics gave flameproofing of unsatisfactory durability, 20 parts of guanidine carbonate, 40 parts ortho-phosphoric acid (78%), 20 parts water, 8 parts ammonium hydroxide (28%) and 10 parts formaldehyde (37%).

The following formula caused excessive tendering when attempts were made to obtain satisfactory durable flameproofing properties on cotton fabrics. 30 parts guanidine carbonate, 130 parts ortho-phosphoric acid (75%), 20 parts water, 8 parts ammonium hydroxide (28%) and 10 parts formaldehyde (37%).

The following formula gave satisfactory flameproofing when applied to cotton fabrics: 30 parts guanidine carbonate, 90 parts ortho-phosphoric acid (75%), 20 parts water, 8 parts ammonium hydroxide and 10 parts formaldehyde (37%).

We have used volatile bases other than ammonium hydroxide. For example, a solution consisting of 200 parts urea, 100 parts phosphoric acid (75%), 114 parts water, 15 parts ethylene diamine and 50 parts formaldehyde (37%), gave good results.

We have also used a mixture of volatile bases instead of ammonium hydroxide. For example, a solution consisting of 200 parts urea, 100 parts phosphoric acid (75%), 100 parts water, 7.5 parts ammonium hydroxide, 7.5 parts ethylene diamine and 50 parts formaldehyde (37%) gave good results.

In substitution of ammonium hydroxide, we may use any basic substance which will participate in the reaction as described, that is, make the solution stable prior to application, and will decompose or volatilize or both under the conditions of the process, to recreate the acid conditions which will bring about the necessary reactions. We may mention such products as trimethylamine, diethylamine, and triethylamine by way of example. In general, the principles hold as previously outlined for other ingredients of the solutions in that the alkaline agent must be substantially soluble in the reaction mixture and not contain carbon chains which are large enough to contribute excessively to the flammability of the finished product.

We have heretofore indicated that the phosphoric acid and urea should be preheated before the addition of water, ammonia and aldehyde. This preheating may as already mentioned be omitted and the phosphoric acid and urea may be mixed in the cold. This, however, involves some sacrifice in the properties and does not represent the optimum results obtainable.

While we have mentioned a number of different acids, nitrogen compounds, volatile bases, and aldehydes, we prefer to use ortho-phosphoric acid, urea, ammonium hydroxide, and formaldehyde. The solution which we prefer to use consists substantially of 200 parts urea, 100 parts ortho-phosphoric acid (75%), 100 parts water, 15 parts ammonium hydroxide (28%) and 50 parts formaldehyde (37%).

We have used formulas as above described on rayon, rayon-wool, rayon-Aralac textile fabrics, as well as on cotton, with good results. (Aralac is a casein product.) On cotton goods we have obtained especially good finishes on herringbone twill, plain weave fabrics, sateen, ducks and similar fabrics. Satisfactory results can be obtained on animal fibers insofar as durability is concerned, but not as good as is the case in the process of the aforesaid application.

We have also obtained good results on paper, wood pulp and plain wood. Usually pressure in application is to be resorted to.

The flameproofing process here described may be used in conjunction with conventional chemical and mechanical treatment processes, either before or after the application of the flameproofing treatment, provided such processes do not interfere excessively with the flameproofing results obtained.

In the case of general textiles such additional processes may be used, as, for example, other flameproofing processes, softening treatments, water-proofing, printing, dyeing or coating treatments. For example, excellent results have been obtained by coating nitrocellulose and vinylite coatings on fabrics previously flameproofed by the process here described.

In the case of garment fabrics, we have made use extensively of such additional mechanical and chemical processes to obtain desired results. For example, softening agents in small quantities, so as not to interfere excessively with the flameproofing properties, have been added to improve the hand and strength of the fabric. Softening materials which are durable to subsequent washing treatments are especially useful, for example, the commercial products "Zelan" (stearamidomethylpyridinium chloride) and "No-Rane" (stearoyloxymethylpyridinium chloride) have been used as have other cation acting materials. Softening agents which are not durable may be used as well, such as lecithin, acetamide, sulfonated fatty matter, etc., but the results obtained with these products are not as desirable.

Variations are obtained by the condition of the material; for example, certain types of weaves are especially adapted while others are less so. Thus a herringbone twill gives excellent results while a hard twist, tightly woven twill is less adapted.

Where odor and toxicity and slow decomposition are of no consequence, other substances than those specifically herein mentioned may be employed providing they answer to the general requirements hereinbefore set forth.

Attention is called to the fact that certain portions of the subject matter disclosed herein are also disclosed and are claimed in our co-pending application Serial No. 596,592, filed May 29, 1945.

We claim:

1. In the art of producing a complex of acid and nitrogen with cellulose fibrous materials to impart durable flame and mildew resistance thereto, the method which consists in impregnating the fibrous material with an aqueous solution of (1) at least one substantially water soluble inorganic acid compound selected from the class consisting of acids of phosphorus and sulfur which are free of metal and of organic groups and of constituents yielding active oxygen or halogen and which are substantially non-volatile under the conditions of the process and metal-free salts of such acid compounds decomposable, and the anion of which is volatile, under the conditions of the process, to yield the acid, (2) at least one non-metallic organic compound basic in the acid solution and soluble therein and which contains nitrogen and has an atomic ratio of carbon to nitrogen not substantially more than the ratio of carbon to nitrogen in biuret, (3) a water soluble volatile alkaline compound in an amount sufficient to give to the solution a pH of from 6 to 8, and (4) an aldehyde compound chosen from the class consisting of formaldehyde, hexamethylene tetramine, acetaldehyde, and glyoxal, the amount of said nitrogen containing organic compound in the solution having a ratio to the acid in the solution of from 1 mol to 10 mols to 1 mol of acid on the basis of orthophosphoric acid and the amount of aldehyde in the solution having a ratio to the acid in the solution of from .2 to 1.5 mols to 1 mol of acid on the basis of orthophosphoric acid; the amount of solids applied to the material being the equivalent of that applied by a single application, followed by a squeeze in a textile mangle to remove excess solution, with a solution containing the equivalent of from 10.8% to 42% of orthophosphoric acid by weight and with the nitrogen containing organic compound and the aldehyde present in relation to the acid in amounts within the ratios just above specified; drying the material, and heating the dried material to a temperature ranging from 400° F. to 250° F. for a time ranging from 30 seconds to 2 hours.

2. The process of claim 1 in which the temperature ranges from 345° F. to 290° F. and the time ranges from 2 to 40 minutes.

3. The process of claim 1 in which the ratio of organic nitrogen containing compound is from 1.75 mols to 5 mols to 1 mol of acid on the basis of orthophosphoric acid.

4. The process of claim 1 in which the acid is orthophosphoric, the nitrogen containing compound is urea, the alkaline agent is ammonium hydroxide, and the aldehyde is formaldehyde in the following proportions by weight:

| | Parts |
|---|---|
| Orthophosphoric (75%) | 100 |
| Urea | 200 |
| Ammonium hydroxide (28%) | 15 |
| Formaldehyde (37%) | 50 |
| Water | 100 |

FLORENCE M. FORD.
WILLIAM P. HALL.

REFERENCES CITED

The following references are of record in the file of this patent:

UNITED STATES PATENTS

| Number | Name | Date |
|---|---|---|
| 1,436,231 | Blenio | Nov. 21, 1922 |
| 1,734,516 | Foulds et al. | Nov. 5, 1929 |
| 2,049,217 | Meunier | July 28, 1936 |
| 2,088,227 | Battye et al. | July 27, 1937 |
| 2,089,697 | Groebe | Aug. 10, 1937 |
| 2,098,082 | Bowen et al. | Nov. 2, 1937 |
| 2,212,152 | Cupery | Aug. 20, 1940 |
| 2,233,475 | Dreyfus | Mar. 4, 1941 |
| 2,243,765 | Morton | May 27, 1941 |
| 2,267,277 | Houk et al. | Dec. 23, 1941 |
| 2,274,363 | Foulds et al. | Feb. 24, 1942 |
| 2,332,047 | Bock et al. | Oct. 19, 1943 |

FOREIGN PATENTS

| Number | Country | Date |
|---|---|---|
| 334,408 | Great Britain | Sept. 4, 1930 |
| 446,379 | Great Britain | Apr. 29, 1936 |
| 476,043 | Great Britain | Nov. 29, 1937 |
| 509,408 | Great Britain | July 11, 1939 |
| 510,199 | Great Britain | July 28, 1939 |
| 547,846 | Great Britain | Sept. 15, 1942 |

OTHER REFERENCES

Ser. No. 233,292, Schubert et al. (A. P. C.) pub. May 4, 1943.

Kleek, "Fire Retardant Synthetic-Resin Paints," Amer. Chem. Soc., News Ed., 19, 626–628 (1941).

Certificate of Correction

Patent No. 2,482,756                                              September 27, 1949

FLORENCE M. FORD ET AL.

It is hereby certified that errors appear in the printed specification of the above numbered patent requiring correction as follows:

Column 7, lines 42 and 43, strike out "and alkaline detergents without objectional even withstand several mild washings with soap" and insert instead *even withstand several mild washings with soap and alkaline detergents without objectionable*; column 12, lines 56 and 57, for "solublue" read *soluble*;

and that the said Letters Patent should be read with these corrections therein that the same may conform to the record of the case in the Patent Office.

Signed and sealed this 14th day of February, A. D. 1950.

[SEAL]

THOMAS F. MURPHY,
*Assistant Commissioner of Patents.*